May 6, 1969  G. F. JONAS  3,442,032
SHOE MANUFACTURE

Filed Aug. 23, 1965  Sheet _1_ of 9

Inventor
GILBERT F. JONAS
By
Attorney

United States Patent Office 3,442,032
Patented May 6, 1969

3,442,032
SHOE MANUFACTURE
Gilbert F. Jonas, Nashville, Tenn., assignor to Genesco, Inc., Nashville, Tenn., a corporation of Tennessee
Filed Aug. 23, 1965, Ser. No. 481,578
Int. Cl. A43b *1/00, 10/00*
U.S. Cl. 36—2.5    19 Claims

ABSTRACT OF THE DISCLOSURE

Stiffening portions of apparel and other things which are essentially flexible by applying to the portions thereof which require stiffness a strip of thermoplastic material having inorganic (glass, silicon carbide, aluminum oxide, metal) fibers embedded therein.

---

This invention relates generally to the stiffening of shoes, other apparel, and related articles.

Historically, the structural components of shoes, other apparel and luggage, have used various natural products to provide needed rigidity, shape retention and support. These materials have variously been animal hides, wood, plant fibers, metals, and many other natural or modified ones, including such exotic substances as whalebones. More recently, attempts have been made to use synthetic plastics for these purposes with some, but incomplete, success.

These attempts have included using thermoplastic sheet stock, injection molded components, thermoset resins in combination with fibrous, woven or felted materials impregnated with thermoplastics or thermosets, B staged thermosets, and wet layup thermosets as separate components or formed in process and many variations. They all left much to be desired.

These were used in such places as insoles, box toes, shanks and counters in footwear; stays and boning in foundation garments, lingerie and swim-wear; in millinery and belts and as stays in collars or shirts and blouses; as frames in luggage and handbags. They have failed because, in some cases, the needed strength was obtained by addition of too much weight, or in use the strength initially provided diminished when the article was exposed to moisture, pressure, or just prolonged use.

It is the object of this invention to provide methods and means for imparting needed stiffness and strength in shoes and other articles of apparel, and in light structural members, which can fit into modern manufacturing methods, can be formed in the process of making the article and can do these things while reducing weight and bulk as compared to the conventional means and method which they supersede.

The invention is predicated upon the discovery that known materials may be combined and utilized in a manner such as to effect both economy of manufacture and improvement in structural characteristics of articles normally made in substantial part from flexible or limp materials, such as leather, leather-like materials, fabric, etc., which require to be supplemented, in certain areas, by strengthening and stiffening means.

Shoes are prime example of such articles. Conventionally made largely of leather or leather-like materials, shoes require stiffening means in the upper, at the tip or toe area (in the form of so-called "box-toes") as well as at the back (in the form of so-called "counters"), and also at the sole (in the form of so-called "tucks," "shank stiffeners" and "toe braces") and heel. Some of these areas require stiffness in one direction, but have no need for it in the transverse direction, and could be more comfortable if the stiffness in the unneeded direction were eliminated. Such is the case with "toe braces," "shank stiffeners" and counters, and the present invention contemplates means for imparting unidirectional stiffness thereto with relative flexibility in the transverse direction.

The latter result is accomplished by the provision, in the appropriate areas of composite material which can be conveniently worked in a soft and pliable state, and set in situ into conformity with the contour of a last or other appropriate form, but when set may, if desired, be substantially stiffer in one direction than the other. Such properties are afforded by inorganic fiber embedded in a synthetic resin which is settable by thermic change, preferably thermoplastic, when the inorganic fibers are so oriented that substantially all of the fibers which contact each other are parallel. Glass fibers are ideal, but fibers made of acicular crystals oriented in longitudinal alignment, such as silicon carbide "whiskers," or aluminum oxide "whiskers," or very fine metal fibers, are usable, albeit now uncompetitively expensive. Such glass fibers have a tensile strength of more than 100,000 pounds per square inch; have negligible strength (as compared with organic fibers); can be made in relatively long length an almost microscopic diameter so as to have an "aspect ratio" far greater than 100 to 1; and can be embedded in thermoplastic or thermosetting resins so that substantially all the fibers which contact each other lie substantially parallel, which is the arrangement that yields the desired differential directional stiffness aforesaid. Such a web of unidirectional fibers can be so embedded by drawing it through a bath of liquified resin, and then solidifying the resin either by removing the solvent (if liquified by solvent) or change of temperature (if no solvent was used). For purposes where pluri-directional stiffness is desired, however, the glass fibers can be in virtually continuous lengths felted in a swirl pattern and embedded as above described; in discrete lengths, of an inch or more, piled (loose) about a quarter inch thick, then compressed into a mat, and embedded as above described; or in "fluff," i.e., chopped lengths of about a half inch or less which are mixed with liquid resin and extruded into strip form. However, even for purposes where pluri-directional stiffness is desired, it is preferred to accomplish it by cross-laminating a plurality of plies in each of which the fibers are embedded unidirectionally in the resin because such unidirectional embedding makes it possible to achieve an embedment in which the content of fiber is as much as sixty to eighty percent of the total weight.

The glass fibers embedded in unidirectional orientation are preferably "bundles" of mono-filaments, the bundles being on the order of 0.004 inch in diameter, and each "bundle" consisting of about two hundred mono-filaments. It should be understood that perfect unidirectional orientation of the fibers is practically impossible to attain, as with a material of this sort, occasional stray mono-filament are almost inevitable, and their complete avoidance is not essential. Moreover, it is sometimes desirable to lay a bundle crosswise in order to reduce the tendency of substantially parallel contiguous bundles to creep apart or become disaligned during the process of embedding them in the resinous binder.

The resin selected need only have the properties of compatibility with, and adhering to, fibers, provide the needed rigidity when set, yet be formable at the moderate temperatures which can be tolerated by apparel materials, including leather, and can be formed while heated and at pressures commonly used in making these items. As previously stated, the resin is preferably thermoplastic. A great variety of natural or synthetic thermoplastics, such as the common vinyls, polystyrenes, etc. (which have a softening point above the temperature (e.g., 100° F.) which the completed article may be expected to encounter in use, and below the temperature at which adjacent materials would suffer deterioration during the time of necessary exposure thereto), may be used, but best results have been obtained with phenoxy resins which are polymers of the monomer:

The phenoxy resins soften at a temperature of about 212° F., have tensile strength above 9,000 p.s.i., and tensile elongation of 50 to 100%.

The embedments are preferably made in strip form, e.g. sheets on the order of 0.010–0.020 inch in thickness from which parts of considerable length and breadth can be died out, or thicker rods from which short lengths can be cut for shank stiffeners, structural frames, and the like. Such strips are manufactured, for example, by assembling the fibers in desired orientation and volume, than impregnating the assembly of fibers with the chosen resin in a highly fluid condition, and finally subjecting the resin-enveloped fibers to mechanical pressure (while the resin is soft) to reduce the mass to the desired thickness. It is preferred to use no more of the resin than is necessary to achieve complete bonding and envelopment of the fibers. In cases where the fibers are not readily wet by the chosen resin, they may be pretreated with any compatible surfactant, such as an organosilane or siloxane.

In the accompanying drawings, the application of the embedments above described is illustrated with particular reference to shoes and their manufacture, for which such embedments have peculiar utility in the present state of the art. In the drawings.

Figures 1, 2, 3, 4, 57:
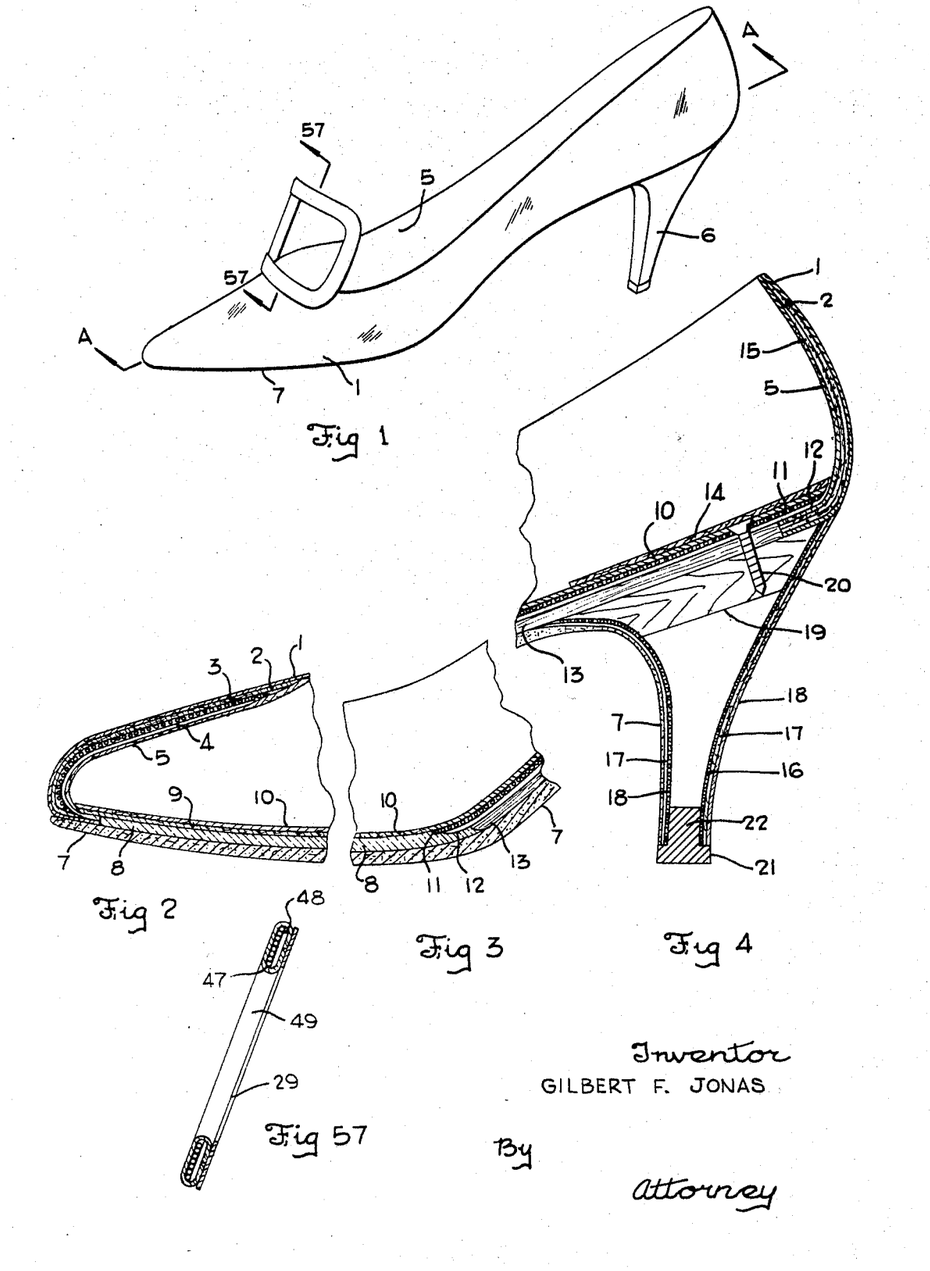
FIGURE 1 is a perspective view of a typical shoe, wherein stiffening at various regions is accomplished by the means and methods of the present invention.
FIGURE 2 is a sectional view, taken along line A—A of FIGURE 1, of the toe or tip portion of the shoe shown in FIGURE 1, and showing stiffening means of the present invention in the tip of the upper so as to serve as a box toe, and also at the tip of the insole so as to serve as a toe brace.
FIGURE 3 is a sectional view taken along line A—A of FIGURE 1, and showing the ball portion of the shoe provided with stiffening means of the invention in the form of a tuck, and in the form of a shank stiffener.
FIGURE 4 is a sectional view taken along line A—A of FIGURE 1, and showing the stiffening means of the present invention in the form of the rear extremities of the tuck and shank stiffener shown in FIGURE 3, as well as in the form of a counter, and in the form of a hollow heel.
FIGURE 57 is a sectional view taken along line 57—57 of the ornament shown on the shoe in FIGURE 1.

The shoe shown in FIGURE 1 comprises the usual upper 1, which may be made of leather, leather-like material, fabric, or any appropriate material, and may, if desired, be provided with an upper lining 5. As usual, the shoe has a heel 6 and an outsole 7 with a lip which covers the breast of heel 6, all in accordance with usual practice in the manufacture of shoes of the style shown. The shoe shown in FIGURE 1 is stiffened and strengthened at the tip of the upper, at the tip of the insole, at the shank and heel area of the insole, and at the back, by thermoplastic embedments of unidirectional fibers of the character previously described, and the heel 6 is constructed almost entirely of such embedments, but none of the embedments are visible on the exterior of the shoe, and consequently do not appear in FIGURE 1. The internal construction of the shoe shown in FIGURE 1, and the arrangement of the parts, is more clearly revealed by FIGURES 2, 3 and 4. As shown in FIGURE 2, there is situated, between the outside upper 1 and the upper lining 5, a box toe composed of two plies 3 and 4 of thermoplastic embedment. Preferably, the plies 3 and 4 are each embedments of the type illustrated in FIGURES 5 and 6, wherein glass fibers 30 extend unidirectionally, that is to say, substantially all of the fibers 30 which are incontact with each other extend substantially parallel with each other. The laminate which constitutes the box toe is shown separately in FIGURE 33, where it will be observed that, in ply 4, the fibers 30 extend in the direction which will ultimately become the lengthwise dimension of the shoe, while in ply 3, the fibers 30 extend in the direction which will ultimately become the widthwise dimension of the shoe. Such an arrangement is herein called cross-lamination. Such cross-lamination may be accomplished prior to assembly of the laminate in the upper, as by heating the individual plies to soften at least the surfaces thereof which will be in contact, and pressing them together. Alternatively, such lamination may be acuomplished by softening ply 3 on at least the face thereof that is to be in contact with doubler 2, and pressing it into adhering relation with doubler 2; and by softening at least the surface of ply 4 which will be in contact with lining 5 and pressing it into adhering engagement with the lining. Preferably, however, the plies 3 and 4 are assembled with the upper, doubler and lining, and the toe end of the assembly heated while on a last. The heating softens the embedments 3 and 4 so that they adhere to each other, and/or to the adjacent doubler, upper, or lining when the shoe is toe lasted, while the embedments remain soft. In any event, at least where the embedment of fibers is in thermoplastic resin, the embedments are conveniently conformed and stabilized in conformity to the contour of the ultimate shoe by subjecting the toe end of the shoe, before, after, or during toe-lasting, to heat and pressure sufficient to soften the thermoplastic, autogenously connect the plies 3 and 4 together, and concurrently adhere the respective plies to the contiguous lining, doubler, or outside upper, in the manner hereinafter described in detail. Such a cross-lamination of embedments 3 and 4 provides the box toe with stiffness and strength not only in the direction lengthwise of the shoe, but also in the direction crosswise of the shoe.

Alternatively, the box toe can be made of embedments of the character illustrated in FIGURES 7, 9 and 11, later to be described. However, to provide the strength and stiffness achieved by cross-lamination of embedments having unidirectional fibers requires a greater volume, and hence weight, of box toe made from embedments of the character illustrated in FIGURES 7, 9 and 11.

Referring again to FIGURE 2, it will be observed that the insole includes a continuous ply 10, which may be a sock liner, to which is secured an embedment 9 which constitutes a toe brace. As the function of a toe brace is only to provide stiffness in the lengthwise direction of the shoe, and flexibility in the widthwise direction is desirable, the embedment 9 is preferably a single ply with unidirectional fibers, as shown in FIGURES 5 and 6. Such embedment is applied to the insole in the manner hereinafter described in connection with FIGURES 13–20 and 25–27.

Between the insole and the outsole, appropriate bottom filler 8 may be provided in the usual manner of shoe manufacture.

Referring now to FIGURES 3 and 4, it will be observed that from the ball area of the shoe rearwardly, there is provided a tuck consisting of cross-laminated embedments 11 and 12. In this area of the sole structure, it is desirable to stiffen and strengthen the shoe not only against bending in the longitudinal direction, but also against bending in the crosswise direction. Accordingly, the tuck, when made of embedments of unidirectional fibers, has the fibers in one ply, such as 11, extending widthwise of the shoe, while the fibers in the other ply, such as 12, extend lengthwise of the shoe. The respective plies are preferably cross-laminated prior to assembly with layer 10 in the manner hereinafter to be described in greater detail. Alternatively, the tuck can be made of embedments of the character illustrated in FIGURES 7, 9 and 11, but as with the case of box toes, at a penalty of greater volume and weight than when made of a cross-lamination of embedments each having unidirectional fibers.

Associated with the shoe bottom, as shown in FIGURES 3 and 4, there is a shank stiffener 13, likewise preferably made as a strip embedment of unidirectional glass fibers in thermoplastic resin, and applied as hereinafter to be described. As the shank stiffener is intended to add rigidity and strength to the shoe only in the direction which resists lengthwise bending, it is not necessary to cross-laminate the shank stiffener.

At the back of the shoe, it is customary to provide a counter for imparting stiffness to the upper in the heightwise dimension, but it is a desideratum for comfort that such a counter be relatively flexible in directions athwart the heightwise direction. Accordingly, counter 15 is preferably made of a thermoplastic embedment in which glass fibers extend unidirectionally heightwise of the upper, save with respect to that portion of the counter which is usually lasted under the insole where the fibers extend in part lengthwise of the shoe, and in part crosswise of the shoe, due to the turning of the margins of the counter along with the other upper parts. Where it is not deemed necessary to provide greater flexibility of the counter in directions athwart to the heightwise direction, the counter 15 can be cross-laminated, or formed of material such as that shown in FIGURES 7, 9 and 11.

The heel 6 is constructed, in the main (from the structural standpoint) of a laminate consisting of a ply of embedment 16 having unidirectional fibers running circumferentially of the heel, and a ply of embedment 17 having unidirectional fibers running heightwise of the heel. Hence, the plies 16 and 17 are cross-laminated, and if desired, may be covered by a ply 18 of leather, or other usual heel covering material. The heel is thus a hollow shell made in the manner hereinafter described in greater detail, and provided at its upper end with a block 19 of wood, or the like, to which the sole structure may be attached as by a screw 20, and provided at the lower end with a top lift 21 having a shank 22 proportioned to fit tightly within the opening defined by ply 16 at the lower end of the heel structure. The outsole 7 is provided with a customary tongue which extends over, and covers, the breast of the heel, as shown in FIGURE 4.

Any appropriate heel pad 14 may be provided to cover the head of screw 20.

Figures 5, 6, 7, 8, 9, 10, 11, 12:
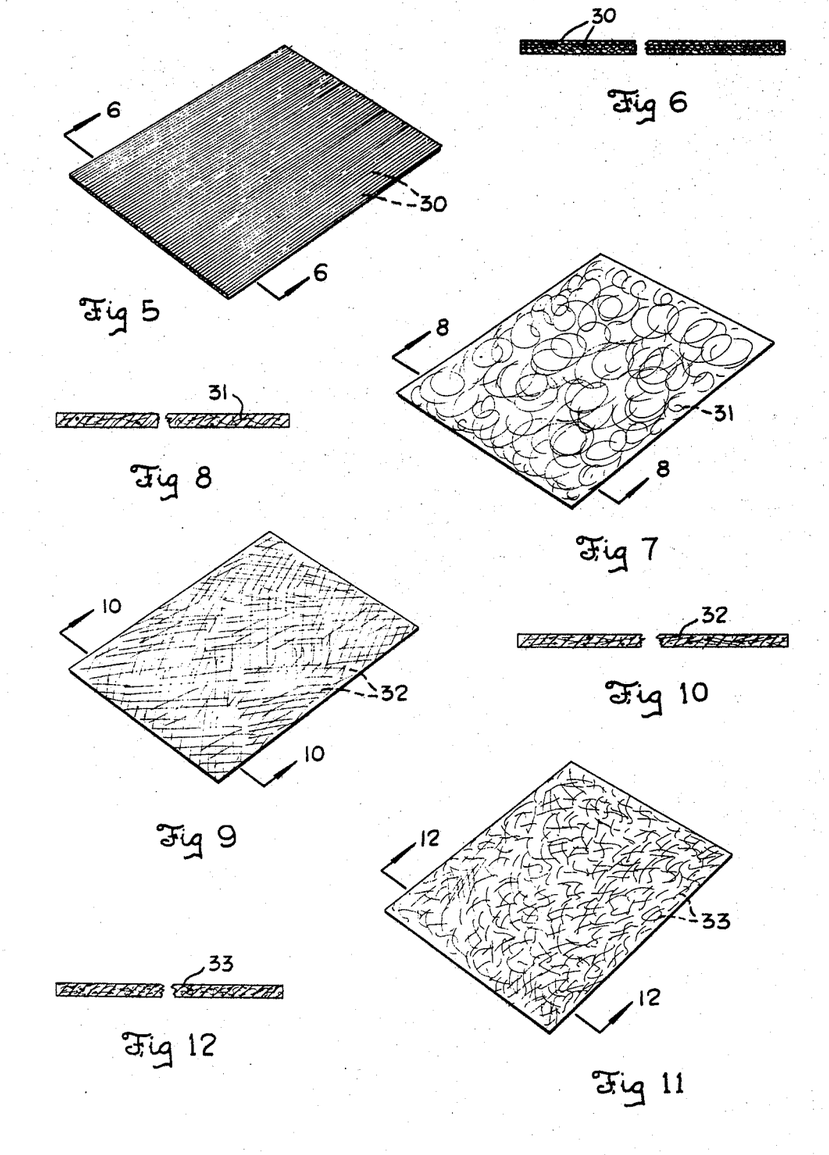
FIGURE 5 is a perspective view of a swatch of embedment made in accordance with the present invention wherein the fibers are unidirectional.
FIGURE 6 is a partial sectional view taken along line 6—6 of FIGURE 5, and showing, on enlarged scale, the relationship of fibers and resin within the embedment shown in FIGURE 5.
FIGURE 7 is a perspective view of a swatch of embedment wherein the fibers are arranged in swirl pattern.
FIGURE 8 is a partial sectional view taken along line 8—8 of FIGURE 7, and showing, on enlarged scale, the relationship of fibers and resin within the embedment shown in FIGURE 7.
FIGURE 9 is a perspective view of a swatch of embedment wherein the fibers are precut to discrete lengths of an inch or more and laid down in a mat, and the mat thereafter impregnated with resin and pressed.
FIGURE 10 is a partial sectional view taken along line 10—10 of FIGURE 9, and showing, on enlarged scale, the relationship of fibers and resin within the embedment shown in FIGURE 9.
FIGURE 11 is a perspective view of a swatch of embedment wherein the fibers are chopped to lengths of approximately one quarter inch and were mixed with resins before sheet formation.
FIGURE 12 is a partial sectional view taken along line 12—12 of FIGURE 11, and showing, on enlarged scale, the relationship of fibers and resin within the embedment shown in FIGURE 11.

As previously indicated, the embedment shown in FIGURES 5 and 6 consists of a multiplicity of glass fiber strands embedded in thermoplastic resin, such as the phenoxy resin hereinbefore mentioned. The individual strands 30 are bundles of mono-filaments. The bundles have their length dimension substantially parallel with each other, and it is preferred that strands or mono-filaments extending crosswise of the lengthwise direction of the strands 30 be held to a minimum so that substantially all of the strands which are in contact with each other extend in the same direction. Such an arrangement makes it possible for the fiber content of the embedment to constitute at least 60%, and if desired, as much as 80%, of the total weight of the embedment.

In the embedment shown in FIGURES 7 and 8, the glass fibers 31 are laid down in a swirl pattern to make a felt which is then embedded in thermoplastic so that the resulting embedment is not characterized by the differential directional stiffness obtained with unidirectional fibers as in FIGURES 5 and 6, and by virtue of the swirl arrangement, there is a greater volume of interstices between and about the fibers that should be occupied by the thermoplastic.

In the embedment shown in FIGURES 9 and 10, the fibers 32 are in lengths of about 1 to 3 inches, and are matted heterogeneously so that, as in the case of the embedment shown in FIGURES 7 and 8, the embedment of FIGURES 9 and 10 does not have the differential directional stiffness and strength of that shown in FIGURES 5 and 6, and the high content of fiber achievable with the unidirectional arrangement cannot be approached.

The fibers 33 in the embedment shown in FIGURES 11 and 12 are chopped into lengths on the order of about a quarter inch, mixed with liquified thermoplastic resin, the mixture extruded in strip form, and solidified. The heterogeneous arrangement of fibers within the embedment makes it as stiff and strong in one direction as in the other, and also precludes the possibility of obtaining the high proportion of fiber weight that is achieved with the unidirectional fiber arrangement of FIGURES 5 and 6. Consequently, in the following specific description, it will be understood that where an embedment is referred to, it is intended to connote an embedment in thermoplastic resin of glass fibers extending unidirectionally, but unless otherwise indicated, where the term "embedment" is employed in the claims, it is to be understood as embracing all the forms of embedment hereinbefore alluded to and their equivalents.

Figure 13:
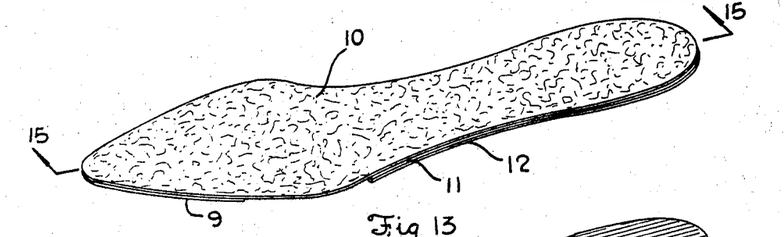
FIGURE 13 is a perspective view of the top side (i.e., foot side) of the insole shown in FIGURES 2, 3, and 4.
Figure 14:
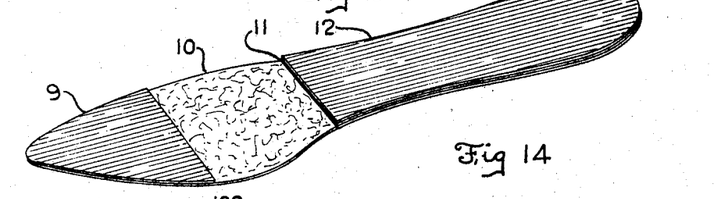
FIGURE 14 is a perspective view taken from the bottom side (i.e., outsole side) of the insole shown in FIGURE 13.
Figure 15:
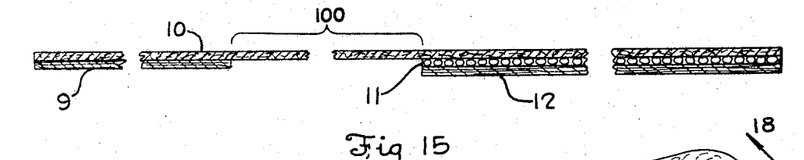
FIGURE 15 is an interrupted sectional view, taken along line 15—15 of FIGURE 13 and on enlarged scale, of the insole shown in FIGURES 13 and 14.
Figures 24, 25:
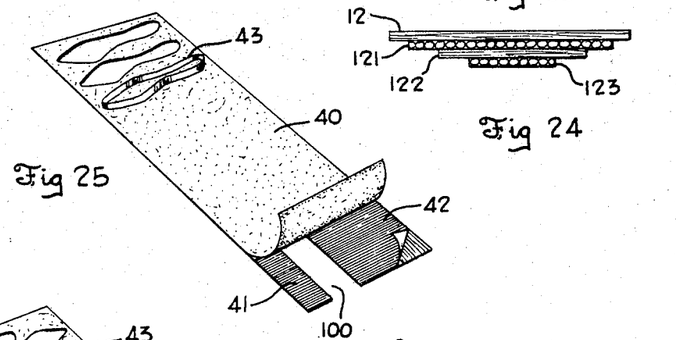
FIGURE 24 is a sectional view corresponding to FIGURES 22 and 23, but showing a four-ply cross-laminated embedment which serves the purpose not only of a tuck, but also of a shank stiffener.
FIGURE 25 is a perspective view of a laminated strip including strips of embedment made in accordance with the present invention, from which insoles of the type shown in FIGURES 13 through 18 may be died out.

Referring now specifically to FIGURES 13, 14 and 15, the composite insole shown in FIGURES 2, 3 and 4 is illustrated in detail. The insole may be conveniently made from sheet stock of any appropriate insole or sock liner material, such as fabric, or natural or synthetic leather-like material. For example, as shown in FIGURE 25, a sheet of sock liner material 40, having a width approximating the maximum length of an insole to be cut, has laminated to it a single ply of embedment 41, wherein the fibers run unidirectionally widthwise of sheet 40. The strip of embedment 41 is adjacent that margin of strip 40 which is to constitute the toe end of the insoles died out of the composite strip. Adjacent the opposite margin of strip 40, there is laminated to it a strip 42 of cross-laminated embedments, in one ply of which the fibers run parallel with the fibers in strip 41, and in the other ply of which the fibers run perpendicular to the direction in the first mentioned ply. Having secured the strips 41 and 42 in spaced relation (as shown at 100) to the sock liner material 40 either by heat and pressure or by adhesive, an appropriate clicker die 43 may be utilized to die out insole blanks, so that embedment 41 is included at the toe end of the died out blank, and cross-laminated embedments 42 are included at the other end of the died out blank. Greater conservation of material can frequently be achieved by utilizing the arrangement shown in FIGURE 26 where sheet stock of sock liner material 40 is laminated to a strip of embedment 44 and a strip of embedment 45 at opposite margins. The embedments 44 and 45 have their fibers unidirectionally oriented crosswise strip 40, and between the two marginal embedments 44 and 45, and in spaced relationship (as shown at 100) therewith, there is provided a cross-lamination of embedments 46. Such an arrangement of the embedments on the sheet stock 40 makes it possible to die out alternate insoles which are oppositely oriented with respect to the composite material being cut, so that the toe ends of alternately cut blanks include a portion of marginal embedment 44, and the intervening ones include a portion of marginal embedment 45, but not both, but all include the cross-laminated embedments 46 which are spaced from embedment 44 or 45 as the case may be.

Figure 19:
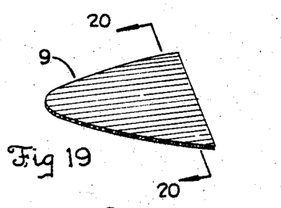
FIGURE 19 is a perspective view of a died out swatch of unidirectional fiber embedment used as the toe brace in the insoles of FIGURES 13 through 18.
Figure 20:
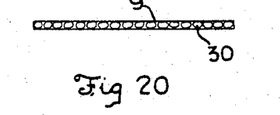
FIGURE 20 is a sectional view, on enlarged scale, taken along line 20—20 of FIGURE 19.
Figures 21, 22:
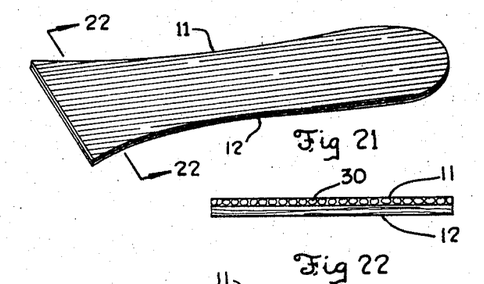
FIGURE 21 is a perspective view of a died out swatch of multi-ply embedment utilized as a tuck in the insole shown in FIGURES 13 through 18, and wherein the fibers are unidirectional in the respective plies, but the plies are cross-laminated so that the fibers in one ply run lengthwise, and the fibers in the other ply run crosswise.
FIGURE 22 is a sectional view taken along line 22—22 of FIGURE 21.
Figure 23:
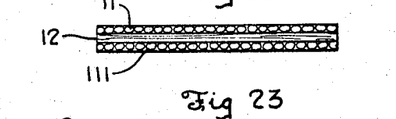
FIGURE 23 is a sectional view corresponding to FIGURE 22, but showing a three-ply tuck.
Figures 26, 27:
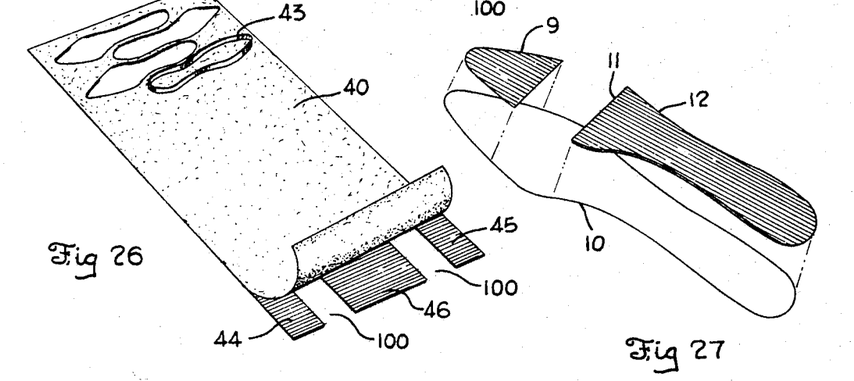
FIGURE 26 is a perspective view corresponding generally to FIGURE 25, but showing another form of laminated strips from which the insoles may be died out.
FIGURE 27 is an exploded perspective view of the insole shown in FIGURE 14.

It is obvious, of course, that toe brace embedments 9 may be separately died out of sheets of embedment to produce blanks, as shown in FIGURES 19 and 20; and tuck blanks may be died out of sheets of cross-laminated embedments 11 and 12, as shown in FIGURES 21 and 22. When and if desired, the tuck blank may consist of more than two ply of cross-lamination, as shown in FIGURE 23, where there is added to the plies 11 and 12 a third ply 111 whose fibers are unidirectional and parallel to the fibers in embedment 11. Moreover, the several embedment plies may, if desired, be of different widthwise dimension for all or part of their length. As shown in FIGURE 24, embedment 11 is omitted so that the uppermost ply of the tuck is of the same width as previously, but succeeding plies 121, 122 and 123 are progressively narrower. With this arrangement, a combination tuck and shank stiffener is provided. Where the tuck and toe brace are separately died out of pluri-ply cross-laminated embedments, and single ply embedment, respectively, the parts can be assembled on insole blank 10, as shown in FIGURE 27, with a space between them to provide for flexibility in all directions at the ball area of the insole. The toe brace 9 and tuck may be secured to the insole blank 10 either by appropriate permanent adhesive, or by softening the thermoplastic of the embedments, so that it adheres to the insole blank, or if desired, the toe brace and tuck may be temporarily secured to the insole blank, to be integrated therewith when the insole is subjected to heat and pressure to permanently conform the parts to the contour of a last bottom as later to be described.

Figures 16, 17:
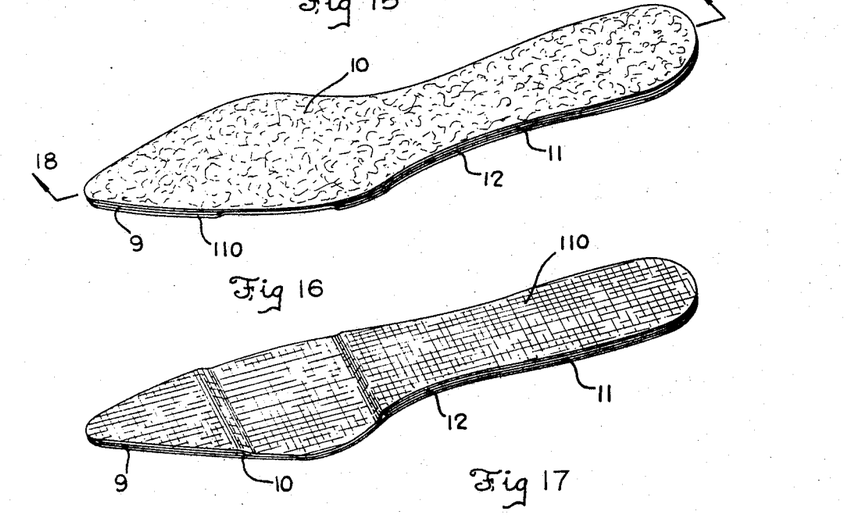
FIGURES 16, 17 and 18 correspond, respectively, to FIGURES 13, 14 and 15, but show an alternative form of insole stiffened in accordance with the present invention.
Figure 18:
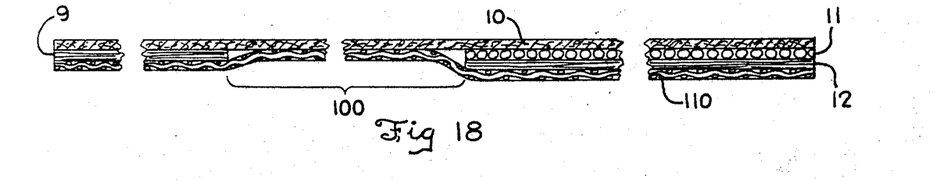

While in the immediately preceding description, the toe brace embedment 9 and the cross-laminated tuck embedments 11 and 12 have been disclosed as being secured to the underside of sock liner material, FIGURES 16, 17 and 18 disclose an alternative form in which the toe brace embedment 9 and the cross-laminated tuck embedments 11 and 12 are assembled upon, and secured to, an insole base blank 110 of fabric, or the like, and that assembly utilized in the construction of the shoe, with or without the sock liner ply 10. If such assembly is built into the shoe without sock liner 10, the sock liner can be inserted and appropriately secured after the shoemaking operations are completed. Alternatively, the sock liner ply 10 can be laminated with the other plies initially so as to provide a sandwich of embedments between the sock liner 10 and the fabric ply 110, as shown in FIGURE 18.

Figures 28, 29, 30:
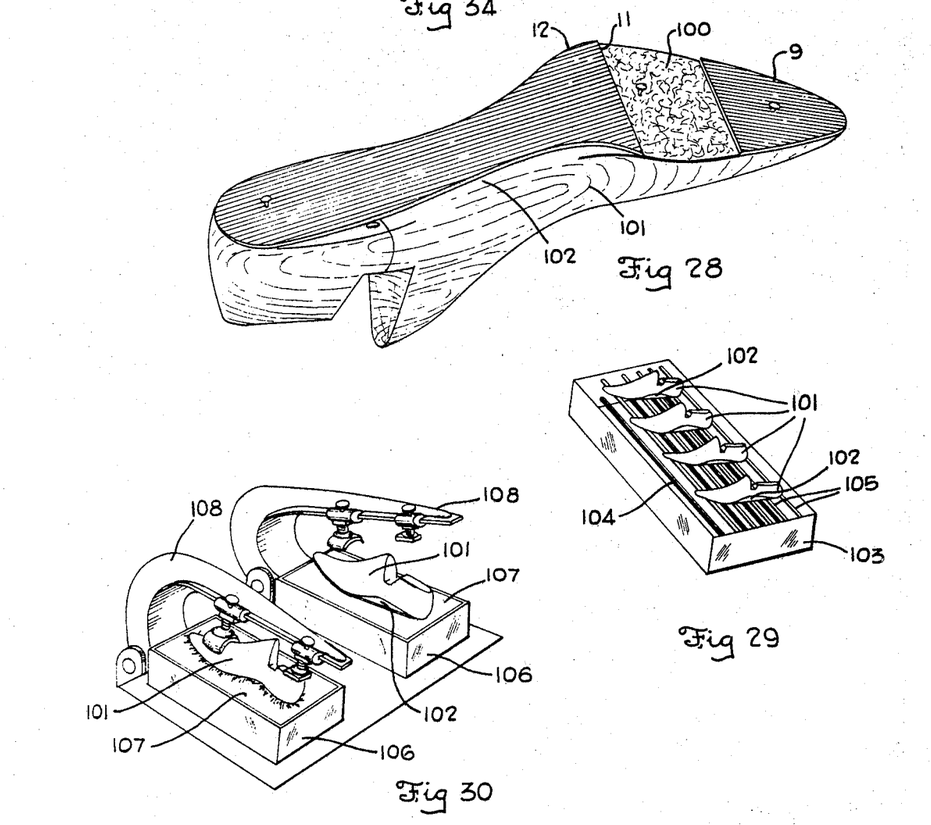
FIGURE 28 is a perspective view of the insole shown in FIGURES 13–15 and 27, mounted upon a last and ready to have the insole softened and conformed with the contour of the bottom of the last.
FIGURE 29 is a perspective view of a device suitable for softening the insoles in position on lasts as shown in FIGURE 28.
FIGURE 30 is a perspective view of two pressure devices suitable for use in conforming the softened insoles to the contour of the last.

Regardless of the procedure by which the several embedments are integrated with insole stock, the resultant insole includes a continuous ply of fibrous or cellulosic material stiffened at the toe end by a single ply of embedment 9, and stiffened from the ball rearwardly by at least two cross-laminated embedments, such as 11 and 12, with an intervening area 100 in the ball region, which is unstiffened in any direction, and hence flexible in all directions. Such a composite insole is then tacked upon the appropriate last 101. When so tacked, a space 102 will normally exist between the central part of the tuck and the shank portion of the last bottom as shown in FIGURE 28. Furthermore, the tip portion of the insole may not be completely contiguous with the tip portion of the last bottom. Consequently, the insole is subjected, while on the last, to an operation which conforms it to the contour of the last bottom, and stabilizes it in that condition.

Suitable apparatus for so conforming and stabilizing the insole is illustrated in FIGURES 29 and 30. The device shown in FIGURE 29 consists of a tray 103, within which there is arranged a series of electrically conductive rods 104 below a series of supporting wires 105, all extending lengthwise of tray 103. Rods 104 are arranged to be electrically energized, so as to radiate heat, and the bottom of tray 103 may be provided with an appropriate reflector to improve the efficiency of the heating. Wires 105 are, however, unenergized and serve merely as a support for a plurality of lasts 101 resting thereon in such manner as to keep the composite insole out of direct contact with energized wires 104. A few minutes' exposure on such a heating device adequately softens the embedments 9, 11 and 12 to permit them, under pressure, to be conformed to the contour of the last bottom. Such conformation is accomplished by an apparatus such as that shown in FIGURE 30, in which two identical pressure devices are shown, one in inoperative position, the other in operative position. Such pressure devices are of a type well known in the art for cementing soles, and consist of a box 106 containing a cushion 107, and provided with a clamping arm 108 for pressing a last against the cushion to an extent sufficient to press all areas of the composite insole uniformly against the last bottom. Accordingly, when a last 101, with a composite insole thereon, has been sufficiently heated to soften the embedments 9, 11 and 12, it is placed on the cushion 107, as shown on the right of FIGURE 30, and the arm 108 brought down upon the last, as shown on the left of FIGURE 30, and maintained in its clamping relationship until the embedments have cooled sufficiently to be permanently set to the contour of the last bottom. In this heating and pressing operation, permanent adhesion is achieved, if it had not previously been achieved, between the several embedments and the adjacent insole parts. As a result of the operations carried out on the apparatus shown in FIGURES 29 and 30, the insole is permanently conformed to the bottom of the last while still connected thereto, as shown in FIGURE 31, in the course of which the space 102 between the insole and the shank region of the last has been eliminated.

Figures 31, 35:
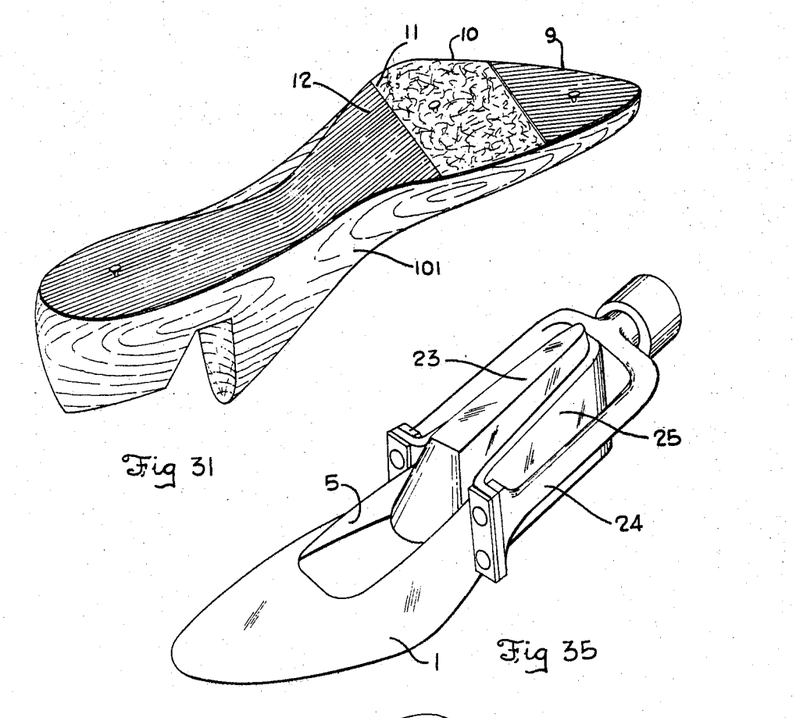
FIGURE 31 is a perspective view of the last and insole shown in FIGURE 28 after it is removed from the pressure device shown in FIGURE 30.
FIGURE 35 is a perspective view of the upper shown in FIGURE 34 in an apparatus for conforming the counter embedment to the contour of the heel end of a last.
Figure 32:
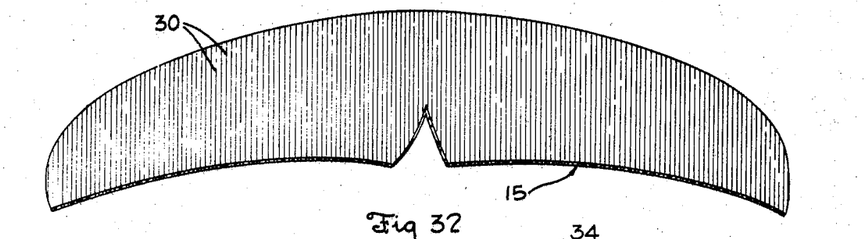
FIGURE 32 is a perspective view of a swatch of embedment wherein the fibers are unidirectional, said swatch being died out to a shape suitable for use as the counter in the shoe shown in FIGURES 1 and 4.
Figure 34:
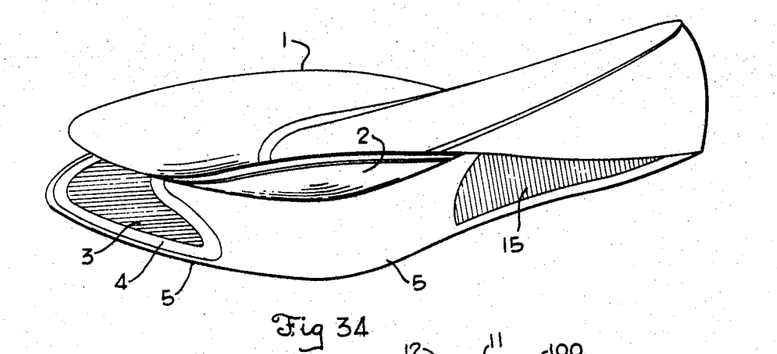
FIGURE 34 is a perspective view of the assembled upper for the shoe shown in FIGURE 1 with counter and box toe embedments in position.

The counter 15 may be died out of a continuous sheet of single-ply embedment such as that employed for making the toe brace, and may be cut to any desired contour, such as that shown in FIGURE 32, the blank being cut in a manner such that the unidirectional fibers 30 are parallel with each other and extend in the direction which will constitute the height of the upper in the shoe. Such a counter blank, as cut, is quite flexible to bending forces which tend to move the extremities thereof toward each other, and hence may be readily conformed by hand to the contour of the rear end of an assembled upper, as shown in FIGURE 34. The counter blank 15 being thus interposed between doubler 2 and lining 5 in the assembled upper, the rear end of the assembled upper is inserted in a heating and pressing clamp, as shown in FIGURE 35.

Figure 36:
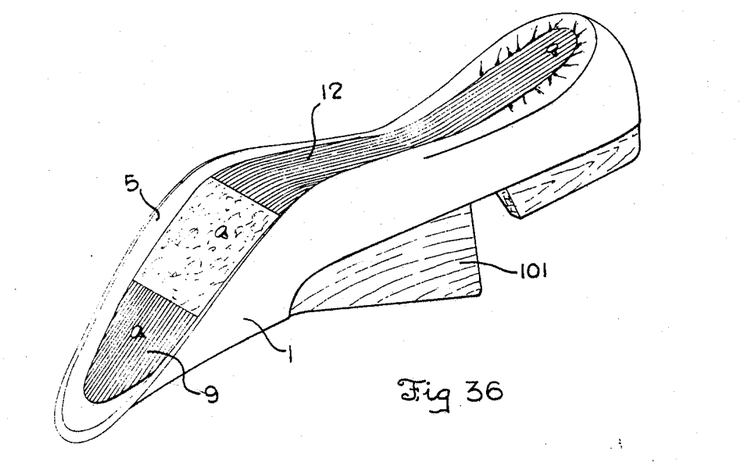
FIGURE 36 is a perspective view of the insole and last shown in FIGURE 31, with the assembled upper shown in FIGURES 5 heel lasted to the insole.

The apparatus shown in FIGURE 35 comprises a heatable form 23 whose external size and shape correspond substantially with those of the counter-embracing portions of the last on which the shoe is made. The form 23 is preferably internally heated to a temperature sufficient to soften the thermoplastic resin in the embedment from which the counter was cut. After the heel end of the assembled upper is appropriately positioned upon the heated form 23, the counter area of the outside upper is pressed inwardly against the form by any appropriate means which, as shown in FIGURE 35, consists of a fork 24, to the extremities of which are secured an elastic belt 25 of length sufficient to embrace the entire area of the upper where the counter is located. Hence, when the belt 25 is maintained taut against the outside upper, while the lining of the upper is in contact with form 23 and the parts maintained in that position for a time sufficient, at the temperature of form 23, to soften the thermoplastic resin in the counter embedment, the counter assumes its final contour, and in the process of so doing, may adhere itself to the layers of the shoe upper on either side of it, to wit: the upper lining 5 on the inside, and the doubler 2 on the outside, in the construction shown in FIGURE 4. Having so conformed the counter, the temperature thereof is reduced below the softening point of the thermoplastic resin in order to set it. Such temperature reduction may be accomplished, if desired, by cooling the form 23, but it is preferable to remove the upper from the apparatus shown in FIGURE 35 and immediately mount it on a last and heel last it, as shown in FIGURE 36, prior to the time the softened thermoplastic has set. In this way, the counter is set to the exact contour of the last by cooling at ambient temperature.

Figures 37, 38, 44, 45:
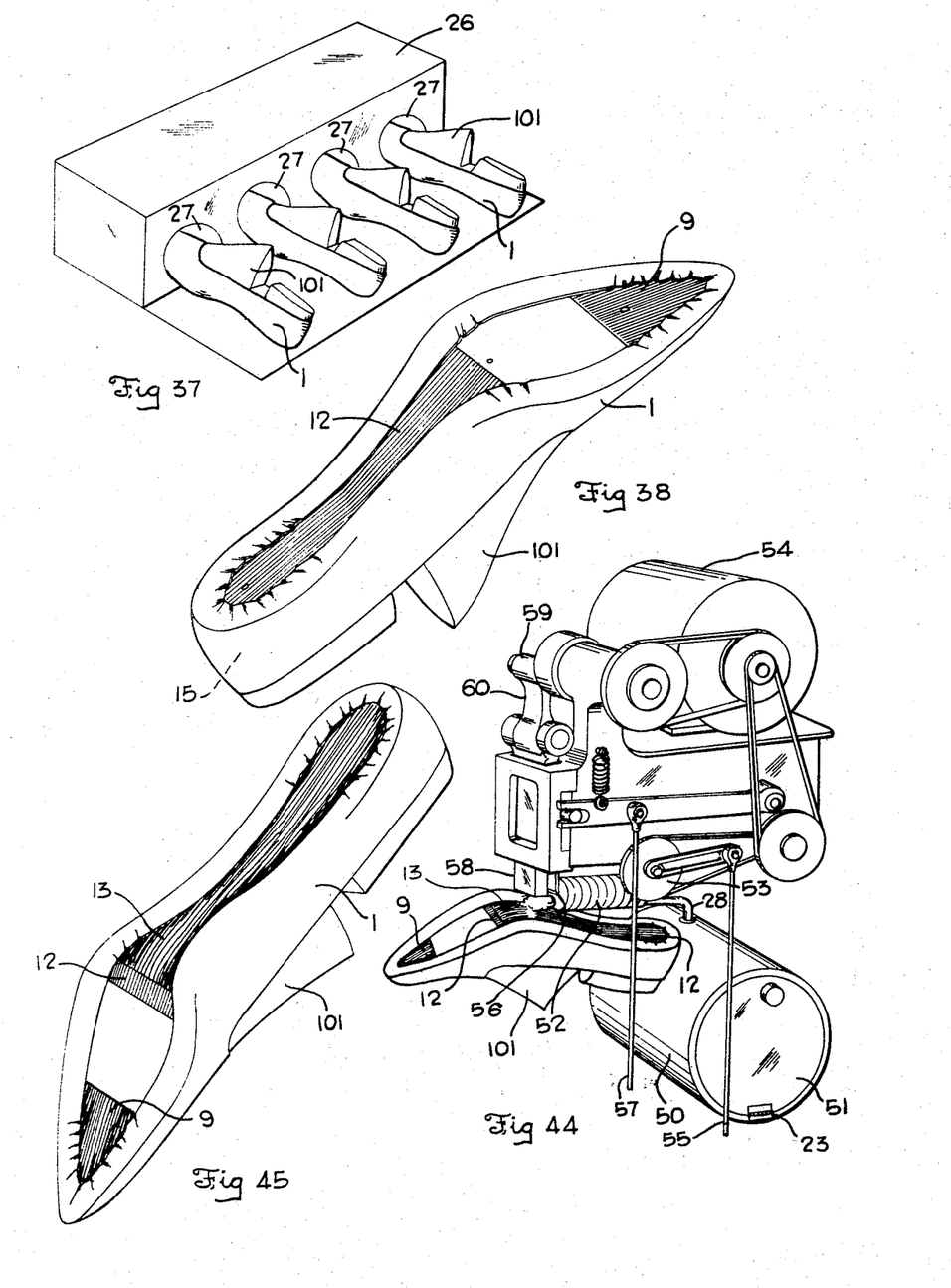
FIGURE 37 is a perspective view of an apparatus for softening and conforming the box toe laminate of the upper shown in FIGURES 34–36 into conformity with the contour of the toe end of the last.
FIGURE 38 is a perspective view of the last, upper and insole assembly shown in FIGURES 36 and 37 after toe and side lasting.
FIGURE 44 is a perspective view of an apparatus for applying embedment rods of the type shown in FIGURES 40–43 as a shank stiffener to the lasted shoe shown in FIGURE 38.
FIGURE 45 is a perspective view of the lasted shoe shown in FIGURE 38 after the shank stiffener is applied.

The bed lasted shoe, while still on the last, may then have the toe end thereof inserted into the heating device 26 shown in FIGURE 37, which is in the nature of an oven with appropriate heating devices on the interior, and having a plurality of ports 27 into which the toe ends of the bed lasted shoes, while on the lasts, may be inserted and left for a period of time sufficient to soften the embedments 3 and 4 which constitute the box toe. While the box toe remains so softened, the upper is pulled over the tip of the last and toe lasted with intervening heating, if necessary. However, machines are available wherein the fore part of the shoe, after having been once heated, can be pulled over and toe lasted simultaneously.

As a result of these operations, the bottom of the shoe appears as shown in FIGURE 38.

It should be pointed out that the embedment material hereinbefore described, when used as the counter and/or as the box toe of a shoe, does not require the usual skiving operation for feathering the margins so as to avoid the occurrence of bumps within the finished shoe. The nature of the embedment material, when made with thermoplastic resin and subjected to heating and pressure operations of the character hereinbefore described, is such that the margins automatically feather during the application of pressure.

Given the completely lasted shoe, as shown in FIGURE 38, the next step is to apply a shank stiffener which, as hereinbefore indicated, may be, and preferably is, made of thermoplastic strip material reinforced with unidirectionally extending inorganic fibers, such as glass fibers. For use as the shank stiffener, the strip-like embedment is preferably provided in the rod form shown in FIGURES 40–41 or 42–43. Such rod-like embedments preferably have a thickness of at least about 0.25 inch, and are preferably provided in lengths of many feet which may be coiled for convenience of handling. An appropriate apparatus for conditioning and applying such rod-like embedments as the shank stiffener of a shoe is shown in FIGURE 44.

Figure 42:
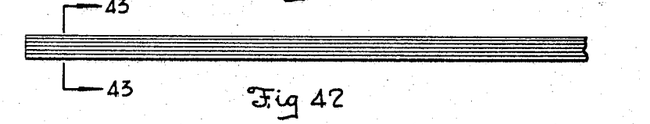
FIGURE 42 is a view in elevation of an alternative rod comparable to that shown in FIGURE 40.
Figure 43:
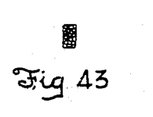
FIGURE 43 is a sectional view taken along line 43—43 of FIGURE 42.

The machine shown in FIGURE 44 feeds, softens, cuts to length, a lengthwise increment of the rod-like embedment 28 shown in FIGURE 42, and presses the same in place in the space between the lasting allowances of the upper, lining, and counter shoe components of the lasted shoe shown in FIGURE 38. Such a machine comprises a drum 50 having a door 51 through which a coil of embedment material, such as that shown in FIGURES 40–43, may be encased. The drum 50 is provided with means for elevating its internal temperature to a point just short of the softening point of the thermoplastic resin from which the rod-like embedment is made, so as to render the coiled rod-like embedment sufficiently flexible to permit it to unwind and feed out through an aperture in drum 50 through an appropriate guide in a somewhat straightened condition, as shown at 28. The rod-like embedment is then fed through a super-heating chamber 52, where its temperature is raised to about 300° F., which is sufficient to render the resin not only quite soft, but sticky. Between drum 50 and the adjacent end of heating chamber 52, any appropriate feed roller arrangement may be utilized for drawing the rod-like embedment 28 out of drum 50 and charging it into chamber 52. Such a feed roller may be driven from pulley 53, which is in turn driven through a series of belts and pulleys from motor 54, and such feed roller may be drawn into or out of operation by a treadle connected to rod 55. At the opposite end, i.e., the exit end, of chamber 52, there is arranged a vertically reciprocable cut-off knife 56, which may be selectively operated, as by a treadle connected to rod 57, to sever the softened embedment as it emerges from the chamber, and when the appropriate length has been discharged in a given operation. Adjacent cut-off knife 56, a vertically reciprocable beater bar 58 is provided. The beater bar is likewise driven by motor 54 through crank 59 and connecting rod 60. The beater bar 58 is kept pulsating rapidly as the softened rod 28 emerges from chamber 52, so as to flatten and press the rod-like embedment increment by increment as last 101, with the lasted shoe upper on it, is moved from right to left, as seen in FIGURE 44. The beater bar 58 pounds the softened embedment into the cavity between the overlasted margins of the upper, filling the same to the desired shape and providing an intimate bond with the insole materials, such as embedment 12 thereadjacent, without the use of tacks, staples, or other customary fastening means. As the application of the embedment to the shoe bottom progresses and reaches the heel end of the shoe, the feed rollers are disengaged to interrupt the feed, and shear bar 56 is operated to sever the embedment by moving directly across the orifice of chamber 52.

The result of the shank applying operation is shown in FIGURE 45, where shank stiffener 13 is contoured in situ, and permanently adhered to the lasted shoe parts while on the last, and hence the contour of the shank stiffener is determined by the contour of the bottom of the last and, in fact, integrated with the adjacent shoe parts. This eliminates the necessity for shoe manufacturers to carry, in inventory, shank stiffeners in great variety of sizes and contours. Depending upon the desire and the skill of the operator, the amount of embedment 28 deposited upon a given shoe may precisely fill the cavity between the margins of the overlasted upper in the shank and heel region, but it will be obvious that if such cavity is not completely filled by embedment 28, the usual bottom filler 8 may be applied, as is customary. The shoe is then completed by conventional operations.

Figure 39:
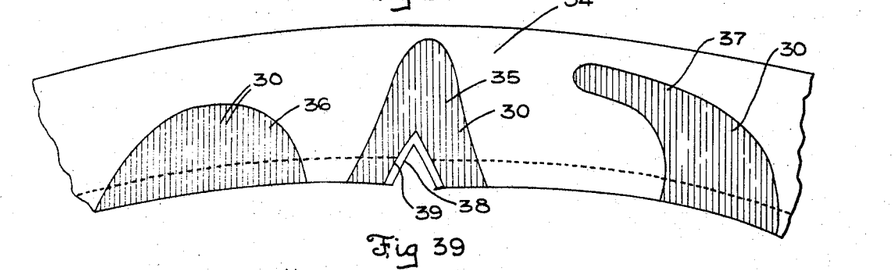
FIGURE 39 is a view in elevation of three alternative forms of abbreviated counter in relation to a typical double quarter of a shoe.
Figures 40, 41:
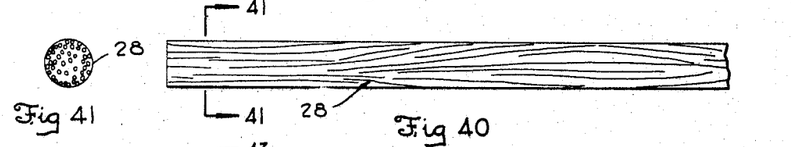
FIGURE 40 is a view in elevation of a strip of embedment with unidirectional fibers, said strip being in the form of a rod suitable for use in making shank stiffeners for shoes and structural frames of other articles.
FIGURE 41 is a sectional view taken along line 41—41 of FIGURE 40.

Several forms of abbreviated counters made with thermoplastic embedment of unidirectional glass fibers are illustrated in FIGURE 39, with relation to a double shoe quarter member 34, in connection with which any one or all of the abbreviated counters 35, 36 and 37 may be used. The respective abbreviated counters are preferably cut from sheet stock of embedment and oriented with relation to the quarter member 34, so that the unidirectional fibers 30 extend in the direction which is the height dimension of the upper in the finished shoe. The abbreviated counter 35 is disposed at the back or "foxing" area of the shoe, and is generally in the shape of an inverted V, so as to provide vertical stiffness immediately adjacent the very back of the upper at a position which would be in alignment with the back seam if the upper had a back seam. The portions of upper quarters 34 and abbreviated counters 35, 36 and 37 which are below the dotted line in FIGURE 39 represent the typical lasting allowance, and the double quarter 34 as well as the abbreviated quarter 35 are provided, respectively, with V-shaped cutouts 38 and 39 extending not only into the lasting allowance, but also into the portion which will be above the sole line in accordance with the common practice in seamless back shoes. These V-shaped cutouts cause the double quarter to be cupped when the margins of the V-shaped cutouts are drawn together and secured in their final relationship.

The abbreviated quarter 36 is disposed in substantially spaced relation from the back of the shoe, and in a position adjacent the arch of the foot to provide stiffness thereat adequate to sustain a cushion or orthopedic device which, without stiffness in the upper, tends to distort it.

Abbreviated counter 37 is likewise in substantially spaced relationship from the back of the shoe, but is intended to provide stiffness at a position corresponding to the extremities of the counter shown in FIGURE 32. The abbreviated counter 37 is also of particular utility in connection with open-back shoes, where the form of abbreviated counter 37 is particularly desirable for stiffening the root end of a strap or buckle connection.

Figures 46, 47, 48, 49, 50, 51, 52, 53:
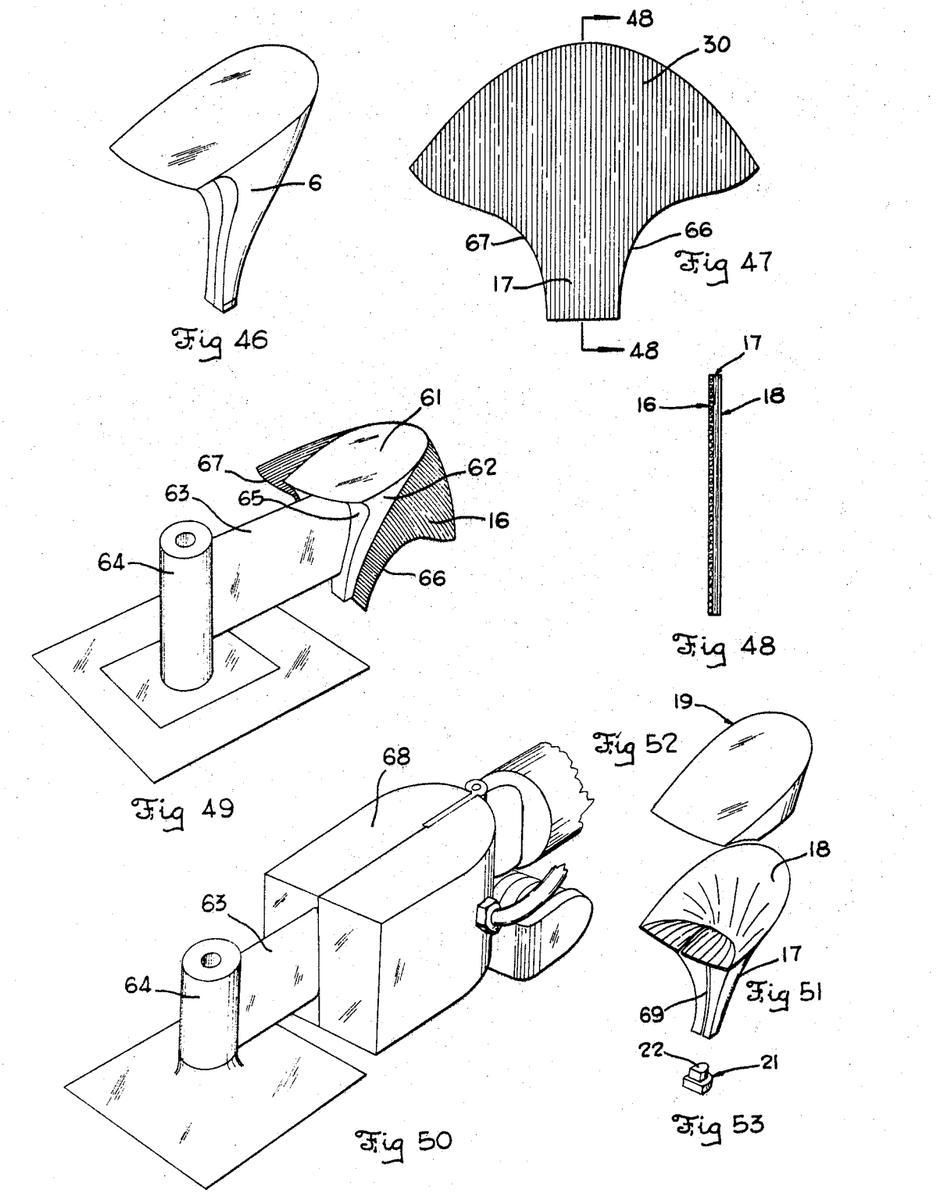
FIGURE 46 is a perspective view of the heel shown in FIGURES 1 and 4.
FIGURE 47 is a plan view of a swatch of material, which may be leather (or other heel covering material), or embedment with unidirectional fibers died out to the contour required for producing the heel shown in FIGURE 46.
FIGURE 48 is a sectional view taken at the position of line 48—48 in FIGURE 47, but showing a laminate comprising two cross-laminated plies of embedment having unidirectional fibers and a ply of heel covering material.
FIGURE 49 is a perspective view of a form for preliminarily contouring the laminate shown in FIGURE 48 partially into the shape shown in FIGURE 46.
FIGURE 50 is a perspective view showing the form of FIGURE 49 in association with a female mold for completing the contour of the laminate shown in FIGURE 48.
FIGURE 51 is a perspective view of the heel shell after completion of the operation illustrated in FIGURE 50.
FIGURE 52 is a perspective view of a nailing plug for assembly with the heel shell shown in FIGURE 51.
FIGURE 53 is a perspective view of a top lift for association with the heel shell shown in FIGURE 51.

Thermoplastic embedments of glass fibers may also, as hereinbefore indicated, be used for the manufacture of the heel shown in FIGURES 1, 4 and 46. It is preferable, in the manufacture of heels from embedments of the character hereinbefore described, to utilize sheet material of the character illustrated in FIGURES 5 and 6, where glass fibers are so oriented as to be parallel with each other and extend in a single direction. As previously indicated, the heel is preferably constructed of cross-laminated embedments of the type just mentioned.

To make the heel 6, two blanks of the contour shown in FIGURE 47 are utilized, one, 17, with the fibers 30 therein running heightwise as shown in FIGURE 47, and the other, 16, with the fibers 30 running in the crosswise direction as shown in FIGURE 48. A third ply 18, of conventional heel covering material, may be employed, if desired, for decorative purposes.

In conforming and setting the embedments 16 and 17 to heel shape, a device of the character shown in FIGURES 49 may be employed. The device includes a form 61 whose side walls 62 are contoured substantially to the contour of the heel to be produced, but actually smaller than the heel by the amount of thickness to be occupied by the cross-laminate of embedments 16 and 17. The form 61 is supported on a thin arm 63 from a pedestal 64. At least adjacent the form 61, the arm 63 is made as thin as practicable, preferably not exceeding a thickness of one sixteenth of an inch for a distance of about an eighth of an inch from the breast-forming contour 65 of form 61. The cross-lamination of embedments 16 and 17, when cut to the contour shown in FIGURE 47, with or without ply 18, are softened by heating, and wrapped around form 61 so that margins 66 and 67 approach each other at the breast 65 of the heel as close as may be. If desired, a suitable temporary adhesive may be applied to the inside of ply 16 to hold it in position on form 61. While so conformed to form 61, a clam-shell type female mold 68, shown in FIGURE 50, is applied to the exterior of the laminate which has been wrapped about form 61, while the laminate is still soft or at least pliable. The cavity within the two halves of mold 68 conforms accurately to the desired external contour of the heel, or are provided internally with an inflatable pad which, when inflated, conforms accurately to the contour of the embedment-covered form 61. This presses the laminate firmly and smoothly on form 61, and conforms the laminate to the shape of the form. The clam-shell mold 68 is maintained closed about the laminate and form until the laminate has set. Then the clam-shaped mold is removed and the formed laminate removed from form 61. In this condition, the laminate appears as shown in FIGURE 51, irrespective of whether the ply 16 of heel covering material was included in the laminate. The shell shown in FIGURE 51 has a slot 69 extending up the breast thereof. This slot will ultimately be covered by the usual breast-covering tongue of the outsole 7, as shown in FIGURE 4, irrespective of whether slot 69 remains open or is closed. To close the slot 69, the edges bounding it may be softened or plasticized, and the preformed shell contracted to abut those edges, and so held until they have autogenously connected themselves. Alternatively, they may be cemented in abutting relation either by a bridging piece on the inside, or by the aforesaid tongue of the outsole on the outside.

The heel shell shown in FIGURE 51 is then connected with block 19 by appropriate adhesive. If the slot 69 is to be closed, the block 19 is contoured to a shape and size slightly smaller than the seat end of the molded heel, so as to fit snugly within the seat end thereof in its final condition. Similarly, the top lift 21, shown in FIGURE 53, and its shank 22 will be proportioned to fit, and be cemented in position within the lower end of the heel shell, the specific magnitude depending upon whether slot 69 is to be closed or left open, as shown.

If desired, arm 63 of the device shown in FIGURES 49 and 50 may connect with form 62 at the heel seat portion rather than the breast portion. While the alternative arrangement permits the embedments to be conformed with slot 69 closed, it does obscure, from ready view of the attendant, whatever surface of the form 61 faces downward, and hence is likely to lead to defective conformity at the down-facing surface.

Figures 33, 54, 55, 56:
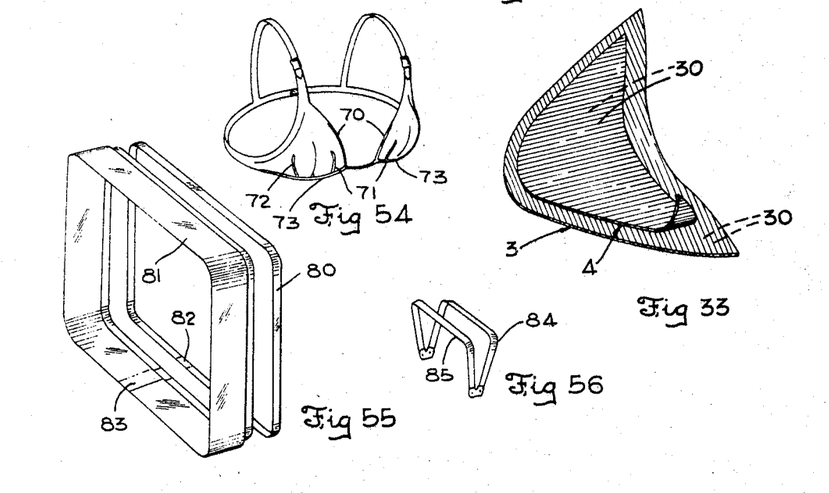
FIGURE 33 is a perspective view of two swatches of embedment having unidirectional fibers, said swatches being died out to the shape utilized in the box toe of the shoe shown in FIGURES 1 and 2, and said swatches being cross-laminated.
FIGURE 54 is a perspective view of an undergarment reinforced with embedments having unidirectional fibers in accordance with the present invention.
FIGURE 55 is a perspective view of a set of luggage frames constructed of embedments made in accordance with the present invention.
FIGURE 56 is a perspective view of a set of handbag frames constructed of embedments made in accordance with the present invention.

In the undergarment shown in FIGURE 54, stays 70, 71, 72, as well as peripheral stay 73, are formed of embedment of the character shown in FIGURES 40, 41, 42, 43, or cut from sheet stock of embedment of the character shown in FIGURES 5 and 6, and preformed to the desired contour by softening and setting while maintained in that contour.

In FIGURE 55, a pair of luggage frames 80 and 81 are formed of embedment having unidirectional fibres extending peripherally, and are made by cutting appropriate length from strip stock of such embedment, softening the same as by heat, contouring them, setting them in the desired shape, and then connecting the ends 82 and 83 either autogenously or in any other appropriate fashion. When, as in frame member 80, there is a substantial dimension transverse to the peripheral dimension, and it is also desired to stiffen the frame in the transverse direction, the frame may be made of cross-laminated embedments of unidirectional fibers.

A further application of the embedment material having unidirectional fibers is shown in FIGURE 56, where a pair of handbag frames 84 and 85 are made from thermoplastic embedment strip stock having unidirectional fibers running lengthwise. After being cut to appropriate length, softened, contoured, and set, the frames may be connected together at their open ends by any appropriate mechanical hinge.

Another application of the unidirectional fiber embedment to light structural frames is shown in FIGURE 1, where the shoe is equipped with an ornamental buckle shown in section in FIGURE 57. The frame of the buckle is a cross-laminate of unidirectional fiber embedments 47 and 48, in the former of which the glass fibers run crosswise of the shoe, and in the latter of which the fibers run heightwise of the shoe. Preferably, the frame is made by cross-laminating sheets of flat embedment and dieing out a substantially O-shaped blank from the cross-laminate; then heating the died out blank sufficiently to soften it, and while so softened, bowing it to produce the desired arcuity. Alternatively, the frame can be made by separately dieing out O-shaped blanks from two embedments; softening the died out blanks as by heat; orienting the embedments, so that the fibers in one run athwart the fibers in the other, and while so softened and oriented, pressing the two embedments together into the desired arcuity which autogenously connects the two embedments concurrently with the conforming thereof to the desired arcuity. If desired, and as shown, the frame, consisting of embedments 47 and 48, after being bonded together and conformed to the desired arcuity, is covered with a strip of leather 49, or other appropriate finishing material. Finally, if desired, a liner 29 may be applied to the back of the buckle, so as to conceal the joints in the covering 49. Connection to the shoe upper may be achieved either by adhesive or by stiching through the liner 29.

While, in the foregoing description and in the accompanying drawings, a variety of uses and applications has been described for the thermoplastic embedment of unidirectional glass fibers, it is to be understood that in those instances where differential directional stiffness is not desired, the other forms of fiber embedment shown in FIGURES 7 through 12 may be employed, albeit at a sacrifice of fiber content per unit of weight. Furthermore, while the embedment material hereinbefore disclosed is of particular utility in the manufacture of shoes, apparel, and related articles, it is not to be understood that the invention is limited to the application of such embedments in ultimate articles of the character herein specifically referred to.

Having thus described the invention, what is claimed and desired to be secured by Letters Patent is:

1. In a shoe having an upper including tip and back portions, an outsole, an insole including tip and tuck portions, a shank stiffener, a box toe at the tip of the upper, a counter at the back of the upper, and a heel, the improvement which comprises, at least one of
   (a) said insole tip portion
   (b) said insole tuck portion
   (c) said shank stiffener
   (d) said box toe
   (e) said counter
   (f) said heel
   being an embedment of inorganic fibers in a thermoplastic resin whose softening point is above 150° F. but below the temperature at which adjacent ones of the shoe parts suffer deterioration during the time necessary to soften the embedment, and said embedment consisting of more than fifty percent by weight of fibers, said fibers having a tensile strength of at least about 100,000 pounds per square inch, so oriented that substantially all the fibers in contact with each other are generally parallel lengthwise, and said embedment being set in the shoe with the individual fibers arched lengthwise.

2. In shoemaking, the method of stiffening and strengthening curvilinear shoe parts which comprises, providing an embedment of inorganic fibers in a thermoplastic resin whose softening point is above 150° F. but below the temperature at which adjacent ones of the shoe parts suffer deterioration during the time necessary to soften the embedment, and said embedment consisting of more than fifty percent by weight of fibers, said fibers having a tensile strength of at least about 100,000 pounds per square inch, so oriented that substantially all the fibers in contact with each other are generally parallel lengthwise, applying said embedment to a shoe part, heating said embedment to render it pliable, while pliable conforming said embedment and said shoe part to curvilinear contour, and while so conformed subjecting the embedment and associated shoe part to thermic change to set the resin.

3. An embedment comprising more than fifty percent by weight of inorganic fibers having a tensile strength of at least about 100,000 p.s.i. and substantially the balance thermoplastic resin having a softening point at least 150° F., said fibers being so oriented within said resin that substantially all the fibers in contact with each other are generally parallel lengthwise.

4. The embedment of claim 3 wherein the fibers are composed of material selected from a group consisting of glass, metal, silicon carbide and aluminum oxide.

5. The embedment of claim 3 wherein the thermoplastic resin is selected from a group consisting of vinyls, polystyrenes and phenoxys.

6. A laminate comprising a plurality of plies of embedment, each ply of the embedment consisting of at least fifty percent by weight of inorganic fiber having a tensile strength of at least about 100,000 p.s.i. and substantially the balance of thermoplastic resin, the fibers in the repective plies being so oriented that substantially all of those in contact with each other are substantially parallel with each other, and the respective plies being so oriented that the fibers in one run athwart the fibers of the other.

7. In shoemaking, a process of strengthening the toe area and upper, which involves, providing a box toe member composed of inorganic fiber embedded in solidified thermoplastic resin, and assembling said member and said upper together with said member located at the toe area of the upper.

8. A shoe having a box toe comprising a plurality of plies of inorganic fiber embedded in solidified thermoplastic resin, substantially all the fibers in contact with each other within a ply being substantially parallel, and the respective plies being so connected that the fibers in one ply run athwart the fibers in the other ply.

9. In shoemaking, a process of strengthening a sole area which involves, providing an insole member comprising inorganic fiber embedded in solidified thermoplastic resin and assembling said member as part of the bottom of a shoe.

10. An insole blank comprising a ply of cellulosic material, a tip ply of inorganic fibers embedded in thermoplastic resin connected to said cellulosic ply at the fore end, and a tuck ply of inorganic fibers embedded in thermoplastic connected to said cellulosic ply at the back end, said tip ply and said tuck ply being substantially spaced lengthwise of the insole.

11. In shoemaking, a process of strengthening the quarter area of an upper which involves, providing a shoe counter member comprising inorganic fibers embedded in solidified thermoplastic resin, and assembling said member and said upper together with said member located at the quarter area of the upper.

12. The process of claim 11 wherein substantially all the fibers are so oriented as to have their length extending in the heightwise direction.

13. In shoemaking, a process of heeling a sole which includes, providing a heel comprising a shell having its walls composed of a contoured sheet-like embedment of inorganic fibers in solidified thermoplastic resin, said inorganic fibers constituting at least fifty percent by weight of the embedment, and mounting said heel on said sole.

14. In the art of making articles such as handbags, luggage, ornaments, apparel and the like, a process which includes, providing an embedment of inorganic fibers in solidified thermoplastic resin, substantially all the fibers in said embedment which are in contact with each other extending parallel with each other, and contouring said embedment to form a frame for the article.

15. The process of claim 13 wherein there are a plurality of plies of embedment each of which has substantially all its fibers in contact with each other so oriented as to be substantially parallel, and the fibers in one ply are so oriented as to extend substantially parallel with the tread surface of the heel while the fibers in the other ply are so oriented as to extend substantially perpendicular to the tread surface of the heel.

16. In the art of stiffening apparel, the process comprising, providing a strip-like embedment of inorganic fibers in solidified thermoplastic resin, said fibers constituting more than fifty percent by weight of the embedment, conforming the strip-like embedment to the desired contour, and connecting the contoured embedment to the apparel at the position therein which requires stiffening.

17. A shoe comprising, an upper having a toe stiffener and a counter, an insole having a toe brace and a tuck, a shank stiffener, and a heel; each of said toe stiffener, said counter, said toe brace, said tuck, said shank stiffener and said heel being formed of thermoplastic embedment of glass fibers having a tensile strength of at least 100,000 p.s.i., said glass fibers constituting 60–80% of the total weight of said embedment and being so oriented therein that substantially all of the glass fibers in any embedment extend substantially parallel lengthwise, the thermoplastic in said embedment having a softening point above about 150° F., the fibers in said toe brace and shank stiffener extending lengthwise of the shoe, the glass fibers in said counter extending heightwise of the shoe, and said box toe, said tuck and said heel each being composed of cross-laminated embedments in one of which the glass fibers run athwart the direction of those in the other.

18. In shoemaking the process comprising, providing a last bearing a lasted shoe sans outsole and heel, providing a rod-like embedment of inorganic fibers in thermoplastic resin having substantially all its fibers extending substantially parallel with each other, the fiber content of said embedment being 60–80% of the total weight thereof, heating said embedment until soft, progressively laying the softened embedment on the shank portion of the bottom of the lasted shoe with the fibers therein extending lengthwise of the shoe, and concurrently pressing the embedment increment by increment against said bottom.

19. A shoe comprising an outsole member, an interior bottom member, an upper secured to at least one of said members, and an embedment of inorganic fibers in solidified thermoplastic, said embedment being disposed between said members to stiffen the shank portion of the shoe.

References Cited

UNITED STATES PATENTS

| | | | |
|---|---|---|---|
| 2,294,982 | 9/1942 | Hathaway | 12—146 |
| 2,343,390 | 3/1944 | Ushakoff | 12—146 |
| 2,425,707 | 8/1947 | Wagner | 12—146 |
| 2,447,681 | 8/1948 | Beckwith et al. | 12—146 |
| 2,670,483 | 3/1954 | Brophy | 12—146 |
| 2,706,351 | 4/1955 | Greenan | 36—77 |
| 2,832,976 | 5/1958 | Huprich | 12—146 |

PATRICK D. LAWSON, *Primary Examiner.*

U.S. Cl. X.R.

36—77; 12—146

U.S. DEPARTMENT OF COMMERCE

PATENT OFFICE

Washington, D.C. 20231

UNITED STATES PATENT OFFICE
CERTIFICATE OF CORRECTION

Patent No. 3,442,032                                                                        May 6, 1969

Gilbert F. Jonas

It is certified that error appears in the above identified patent and that said Letters Patent are hereby corrected as shown below:

Column 1, line 33, "B" should read -- "B" --; line 62, after "are" insert -- a --. Column 2, line 54, "mono-filament" should read -- mono-filaments --. Column 3, line 17, "than" should read -- then --. Column 5, line 2, "FIGURES" should read -- FIGURE --; line 16, "of" should read -- for --. Column 6, line 15, "incontact" should read -- in contact --; line 28, "acuomplished" should read -- accomplished --. Column 10, line 10, "cush on" should read -- cushion --. Column 14, line 19, "fibres" should read -- fibers --; line 65, "stiching" should read -- stitching --. Column 16, line 5, after "connected" insert -- together --; line 10, "resin" should read -- resin, --.

Signed and sealed this 14th day of April 1970.

(SEAL)
Attest:

Edward M. Fletcher, Jr.                                        WILLIAM E. SCHUYLER, JR.
Attesting Officer                                                   Commissioner of Patents